United States Patent
Seward, IV et al.

(10) Patent No.: US 10,154,394 B2
(45) Date of Patent: Dec. 11, 2018

(54) OVER THE AIR IMAGE CONFIGURATION

(71) Applicant: Silicon Laboratories, Inc., Austin, TX (US)

(72) Inventors: DeWitt Clinton Seward, IV, Arlington, MA (US); Clayton Hollis Daigle, Austin, TX (US); Gregory Allan Hodgson, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 7 days.

(21) Appl. No.: 15/334,657

(22) Filed: Oct. 26, 2016

(65) Prior Publication Data
US 2018/0115856 A1    Apr. 26, 2018

(51) Int. Cl.
*H04W 4/50* (2018.01)
*H04L 29/08* (2006.01)
*H04W 4/80* (2018.01)

(52) U.S. Cl.
CPC ............. *H04W 4/50* (2018.02); *H04L 67/34* (2013.01); *H04W 4/80* (2018.02)

(58) Field of Classification Search
CPC ................................................... H04W 4/00
See application file for complete search history.

(56) References Cited

U.S. PATENT DOCUMENTS

| | | | |
|---|---|---|---|
| 2014/0232287 A1* | 8/2014 | Jonsson | F21V 3/00 315/246 |
| 2014/0282487 A1* | 9/2014 | O'Neill | G06F 8/65 717/173 |
| 2014/0359731 A1* | 12/2014 | Gantman | H04L 63/18 726/6 |
| 2017/0059151 A1* | 3/2017 | Black | F21V 33/0052 |

* cited by examiner

*Primary Examiner* — Michael T Vu
(74) *Attorney, Agent, or Firm* — Nields, Lemack & Frame, LLC (57) ABSTRACT

A system and method of allowing a network device to receive a customized version of a reference design is disclosed. In one embodiment, many values that may be subject to customization are no longer fixed by the reference design. Rather, the reference design utilizes rewritable non-volatile memory to store a set of customization values that can be changed, based on a customer's preference. The system also includes a configuration tool, which interfaces with the network device. Using vendor-unique commands, the configuration tool is able to initialize this set of customization values to the values requested by the customer. In operation, the reference design is downloaded into the network device. The configuration tool is then used to establish the customized parameters for a particular customer. This process allows the manufacturer to create one reference design, which can be customized without the need to modify the code or recompile the source code.

17 Claims, 6 Drawing Sheets

OVER THE AIR IMAGE CONFIGURATION

This disclosure describes systems and methods allowing the configuration of a network device by a configuration tool.

BACKGROUND

The explosion of network connected devices has led to an increased use of certain protocols. For example, ZIGBEE® is now commonly used in many applications, including utility meters, lighting systems and the like.

Manufacturers of products using IEEE802.15.4-based network protocols, such as the ZIGBEE® network protocol, deliver their products to customers, often with pre-installed software. This software is intended to be a reference design, showing the customer the capabilities of the product. However, increasing, customers wish to use this reference design as the final product software.

While reducing cost, effort and time to market for the customer, the use of the reference design as the customer's final product software presents issues for the manufacturer. For example, a particular customer may want certain parameters set to unique values in their version of the reference design. These unique values unfortunately may be different for a second customer.

Further, as the manufacturer updates and enhances their reference design, they may be forced to create multiple versions to meet the requests of all of these customers who rely on a customized version of that reference design.

Another approach is for the manufacturer to supply the source code to the customer and allow the customer to make the customizations themselves. The customer would then load the customized software into their products, overwriting the original reference design. However, this approach now requires that the customer employ personnel with this skill. Further, if the customer purchases hundreds or thousands of units, the time and equipment needed to reprogram all of the units may be overwhelming.

Therefore, an improved system and method of allowing a network device to receive a reference design with unique customization would be advantageous. Further, it would be beneficial if this system and method was simple to implement so as to be easily accomplished.

SUMMARY

A system and method of allowing a network device to receive a customized version of a reference design is disclosed. In one embodiment, many values that may be subject to customization are no longer fixed by the reference design. Rather, the reference design utilizes rewritable non-volatile memory to store a set of customizable parameters that can be changed, based on a customer's preference. The system also includes a configuration tool, which interfaces with the network device. Using vendor-unique commands, the configuration tool is able to initialize this set of customizable parameters to the values requested by the customer. In operation, the reference design is downloaded into the network device. The configuration tool is then used to establish the customized parameters for a particular customer. This process allows the manufacturer to create one reference design, which can be customized without the need to modify the code or recompile the source code.

According to one embodiment, a method of modifying customizable parameters within a network device is disclosed. The method comprises establishing a network connection between the network device and a configuration tool, using a first network protocol; downloading new values for the customizable parameters from the configuration tool to the network device; and storing the new values in a nonvolatile memory in the network device. In certain embodiments, the configuration tool uses vendor unique commands to download the new values to the network device. In certain embodiments, the configuration tool issues an unlock sequence to the network device to allow access to the customizable parameters stored in a portion of a nonvolatile memory. In some embodiments, the first network protocol is the same as a network protocol used on the network. In other embodiments, the first network protocol is different from the network protocol used on the network.

In another embodiment, a configuration tool for modifying customizable parameters in a network is disclosed. The configuration tool includes instructions, which when executed, allow the configuration tool to establish a network connection between the network device and the configuration tool via the network interface, using a first network protocol; and download new values for the customizable parameters from the configuration tool to the network device via the network interface.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
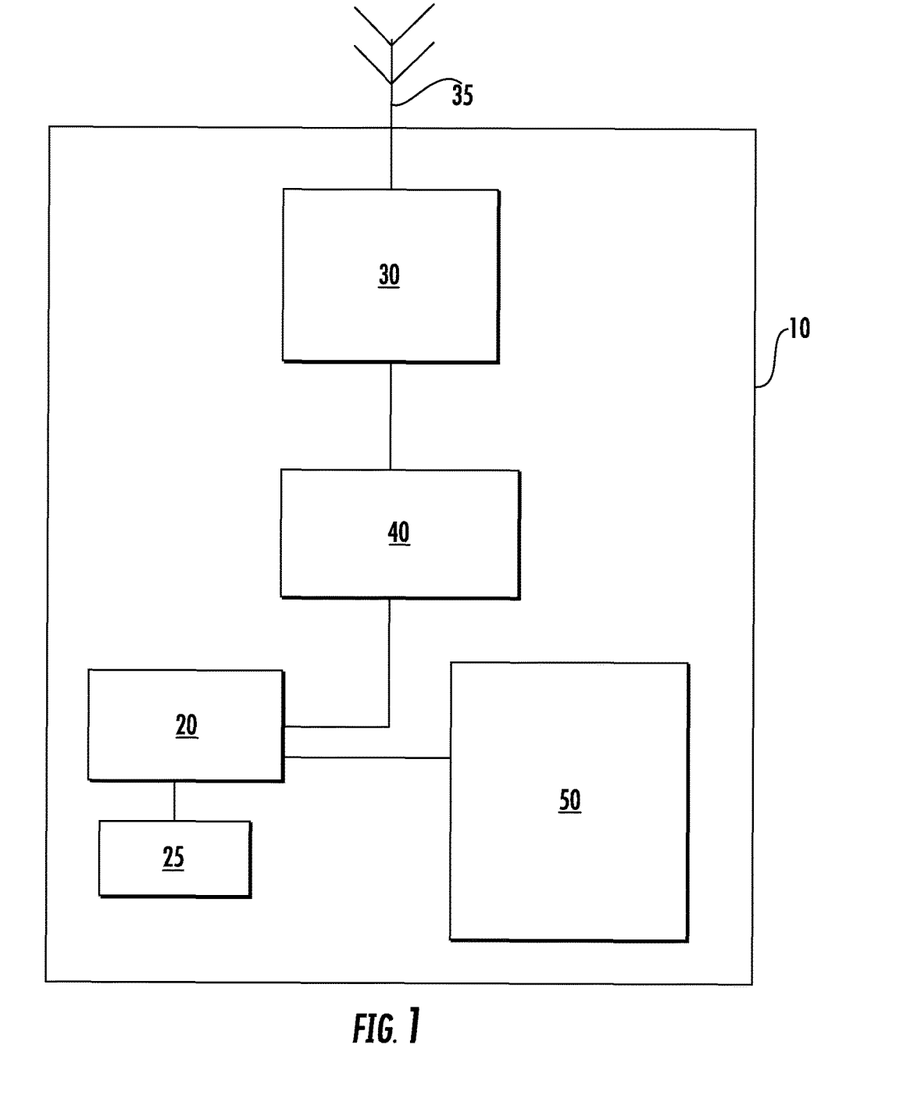
FIG. 1 is a block diagram of the configuration tool.

FIG. 1 shows a block diagram of a representative configuration tool 10. The configuration tool 10 has a processing unit 20 and an associated memory device 25. This memory device 25 contains the instructions, which, when executed by the processing unit 20, enable the configuration tool 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. In certain embodiments, the memory device 25 may be packaged with the processing unit 20. The processing unit 20 may be any suitable device, including but not limited to a general purpose processor, an application specific processor, an embedded controller, or a personal computer (PC).

The configuration tool 10 also includes a network interface 30, which may be a wireless interface including an antenna 35. The network interface 30 may support any wireless network, including an IEEE802.15.4 network protocol, like ZIGBEE® or Thread, BLUETOOTH®, a cellular protocol, such as 3G, GCM, CDMA, 4G, LTE, or other protocols. In other embodiments, the network interface 30 is a wired connection, such as USB. In these embodiments, the network interface 30 may not include an antenna 35.

The configuration tool 10 may include a second memory device 40 in which data that is received by the network interface 30, and data that is to be transmitted by the network interface 30, is stored. This second memory device 40 is traditionally a volatile memory. The processing unit 20 has the ability to read and write the second memory device 40 so as to communicate with the other devices in the network. Although not shown, the configuration tool 10 also has a power supply, which may be a battery or a connection to a permanent power source, such as a wall outlet.

The configuration tool 10 may also include a display element 50. In some embodiments, the display element 50 may be a LED or LCD screen. In certain embodiments, the display element 50 is a touch screen so that input may be supplied to the processing unit 20 through the display element 50. In other embodiments, a separate input device may be employed.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and the programming language is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the configuration tool 10. The instructions contained on this second computer readable media may be downloaded onto the memory device 25 to allow execution of the instructions by the configuration tool 10.

Any device that includes the components enumerated above may be used as the configuration tool. In one specific embodiment, the configuration tool 10 may be a mobile telephone or tablet computer. In another embodiment, the configuration tool 10 is a device which utilizes the same network protocol as the network device to be tested. For example, the configuration tool 10 may be a gateway device, using an IEEE802.15.4 network protocol, such as ZIGBEE® or Thread. In some embodiments, this gateway may be a specially designed device, while in other embodiments, the gateway is a standard device, which also includes the instructions to perform the functions described herein. In certain embodiments, a standard gateway may be converted into the configuration tool 10 by downloading special software to the gateway.

In certain embodiments, the instructions described herein may be packaged as a software application. The configuration tool 10 may receive the software application from a remote server. For example, in one embodiment, a software application may be made available on a remote server, such as a corporate server. In certain embodiments, the software application may be available on a digital distribution platform, such as Google Play, Microsoft Store, the Apple App Store and others. In other embodiments, the instructions may be pre-loaded in the configuration tool 10.

Figure 2:
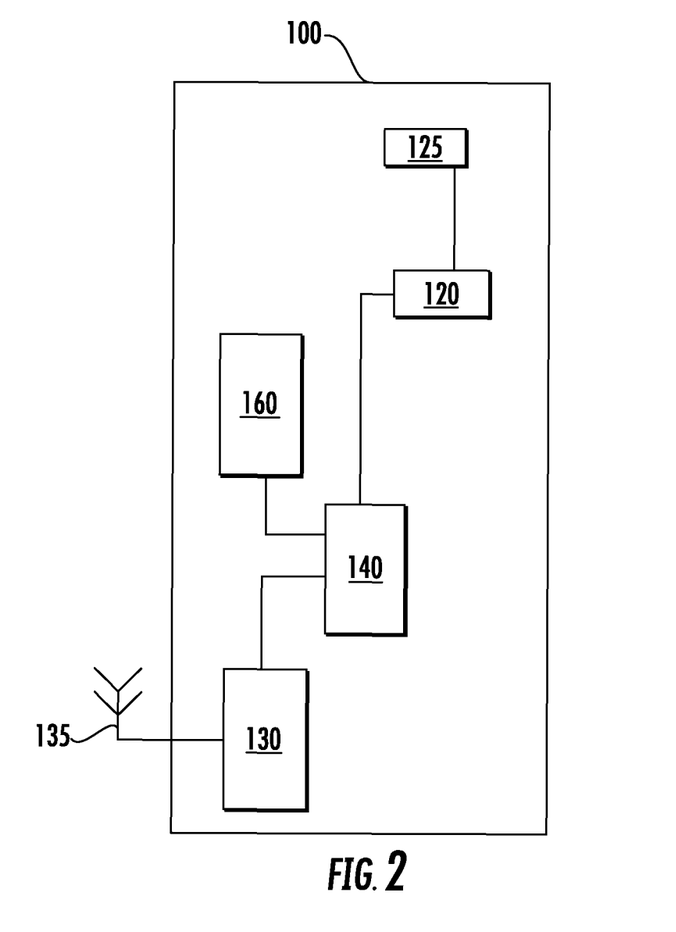
FIG. 2 shows a network device according to one embodiment.

FIG. 2 shows the network device to be configured according to one embodiment. The network device 100 has a processing unit 120 and an associated memory device 125. This memory device 125 contains the instructions, which, when executed by the processing unit 120, enable the network device 100 to perform the functions described herein. This memory device 125 may be a non-volatile memory, such as a FLASH ROM, an electrically erasable ROM or other suitable devices. In other embodiments, the memory device 125 may be a volatile memory, such as a RAM or DRAM. In certain embodiments, the memory device 125 may be packaged with the processing unit 120. The processing unit 120 may be any suitable device, including but not limited to a general purpose processor, an application specific processor, an embedded controller, or a personal computer (PC).

The network device 100 also includes a first network interface 130, which is typically a wireless interface including an antenna 135. The first network interface 130 may support an IEEE802.15.4-based network protocol, such as Thread, ZIGBEE® or the like. The network device 100 may also optionally include a second network interface 160. This second network interface 160 supports a network protocol different from the network protocol used by the first network interface 130. The second network interface 160 may support any wireless network, including BLUETOOTH® or a cellular protocol, such as 3G, GCM, CDMA, 4G, LTE, or other protocols. In other embodiments, the second network interface 160 may be a wired network, such as USB. In certain embodiments, the network device 100 is able to communicate on both network interfaces. In other embodiments, the network device 100 may have multiple software images, where one of these software images is used during the configuration process and allows communication over the second network interface 160. Another of the software images may be used during normal operation and allows communication over the first network interface 130. These software images may be stored internally in the memory device 125, or may be stored in an external memory device, which may be a non-volatile memory device.

The network device 100 may include a second memory device 140 in which data that is received by the first network interface 130 and the optional second network interface 160, and data that is to be transmitted by the network interfaces is stored. This second memory device 140 is traditionally a volatile memory. The processing unit 120 has the ability to read and write the second memory device 140 so as to communicate with the other devices in the network. Although not shown, the network device 100 also has a power supply, which may be a battery or a connection to a permanent power source, such as a wall outlet.

Figure 3:
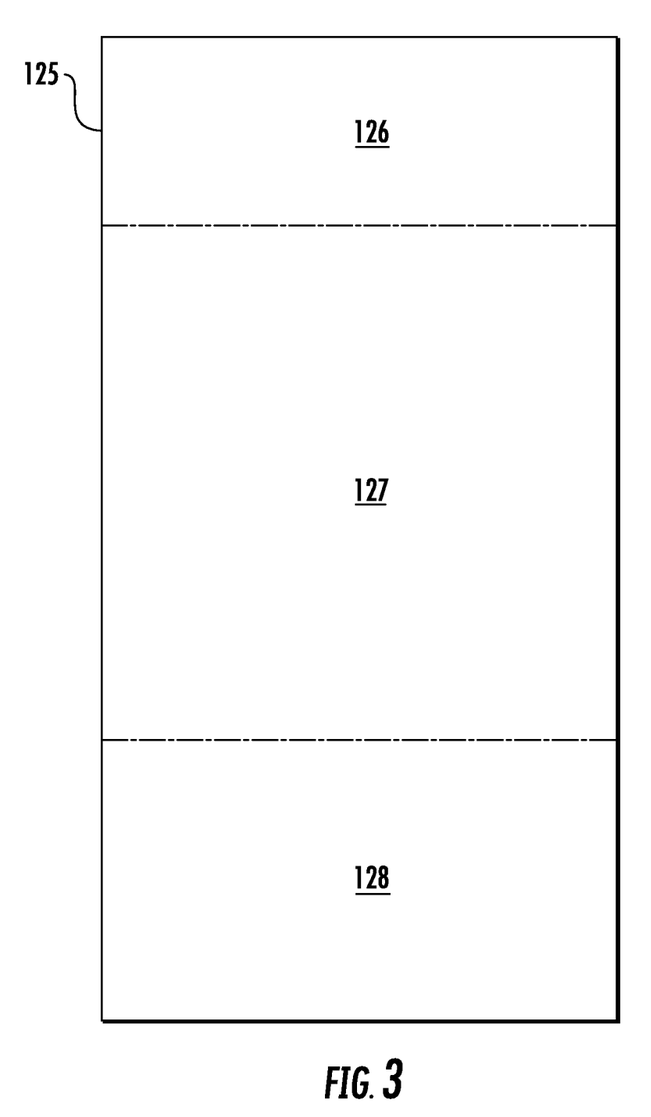
FIG. 3 shows a representative map of the nonvolatile memory of the network device.

FIG. 3 shows a representative map showing the organization of the nonvolatile memory 125 of the network device 100. The nonvolatile memory 125 includes a first portion 126, which may be used to contain the software image. The nonvolatile memory 125 also includes a second portion 127, used to contain the customizable parameters. Finally, the nonvolatile memory 125 may include a third portion 128 that includes other data or information.

The customizable parameters are not limited by this disclosure. However, several different parameters which may be customized are described for illustrative purposes.

The model number and the manufacturer's name are two fields that a customer may wish to customize to reflect their company unique values.

In addition, parameters associated with the network operation of the network device may be customized. For example, in certain embodiments, parameters such as transmit power may be customized.

In certain embodiments, parameters associated with the functionality of the network device 100 may be customized.

For example, in certain embodiments, the network device 100 may be part of a lighting system. In this embodiment, values associated with the lighting may be customized. These parameters include, but are not limited to, the power settings for the light bulb, the details regarding how to dim the light bulb, which may be pulse width modulation (PWM) values, maximum on time, and maximum off time, and the default operation (whether the light is on or off after a power cycle). Maximum on/off times refer to the on/off time of the LED during a single PWM cycle. For example, if the PWM frequency is 1 kHz, it may be desirable to insure that the LEDs are on for no fewer than 16 μS, and it may be desirable that the LEDs are on for no more than 900 μS. These values may be specific to the customer's power supply design for their light bulb. While the above disclosure describes parameters associated with a lighting system, the disclosure is not limited to only lighting systems. Network devices used for other functions may also be customized.

Figure 4A:
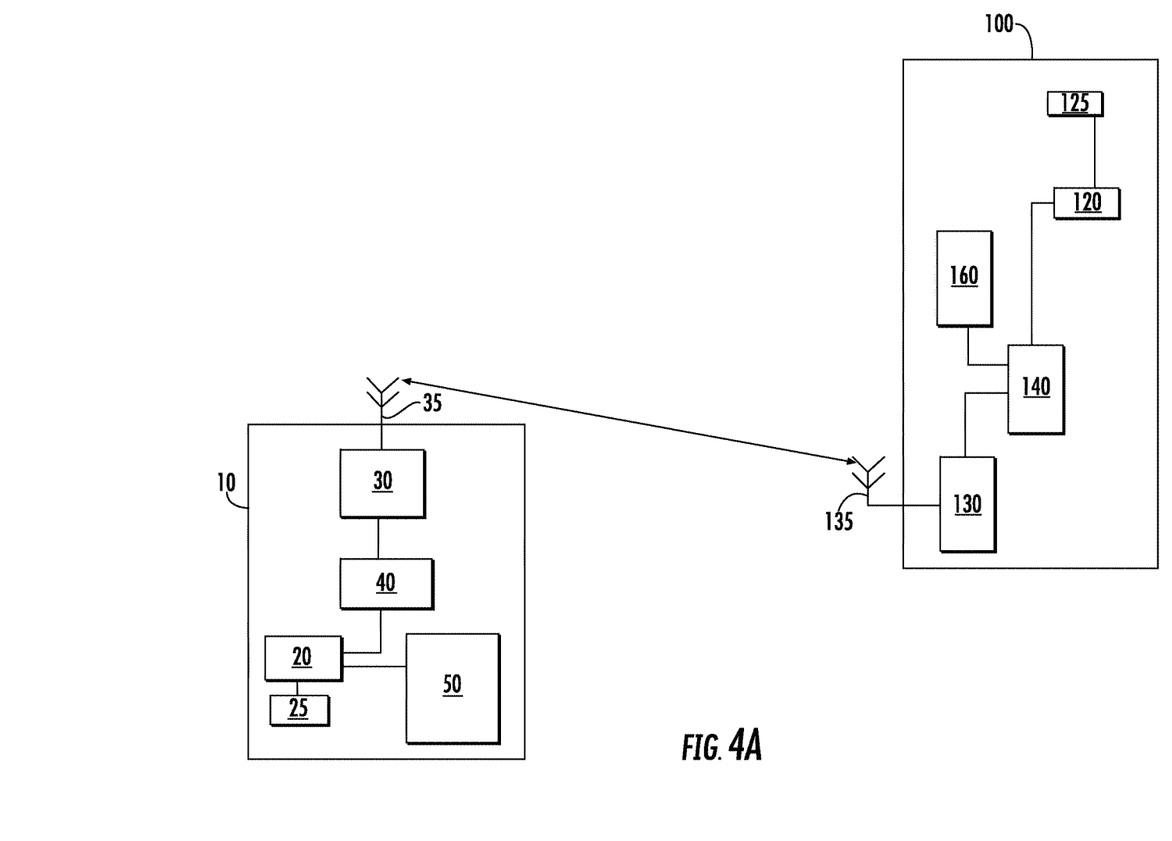
FIGS. 4A-4B show two embodiments used during the customization process.
Figure 4B:
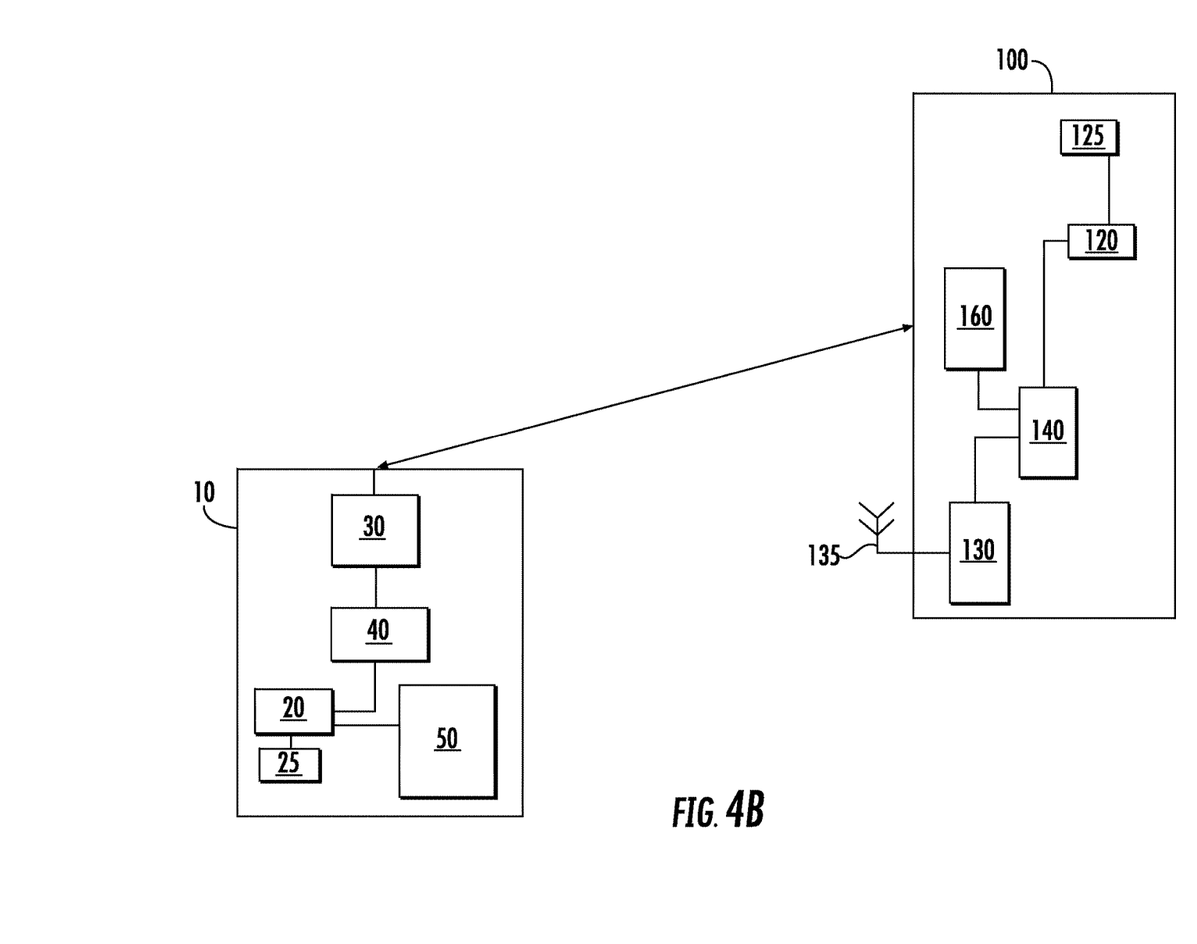

FIG. 4A shows the customization process according to a first embodiment. In this embodiment, the network interface 30 of the configuration tool 10 is able to communicate wirelessly with the first network interface 130 of the network device 100. In a variation of this embodiment, the network interface 30 of the configuration tool 10 is able to communicate wirelessly with the second network interface 160 of the network device 100. FIG. 4B shows the customization process according to a second embodiment. In this embodiment, the network interface 30 of the configuration tool 10 is able to communicate via a wired connection with the second network interface 160 of the network device 100. The choice of network protocol used during the customization process is not limited by this disclosure, and may include Thread, ZIGBEE®, WIFI®, USB, a serial communication protocol, a cellular protocol, or any other suitable protocol. In certain embodiments, the network protocol used during the configuration process is the same as is used by the network device 100 during normal operation.

Having described the physical configuration of these components, the method of using the configuration tool 10 to configure the network device 100 will be described.

Figure 5:
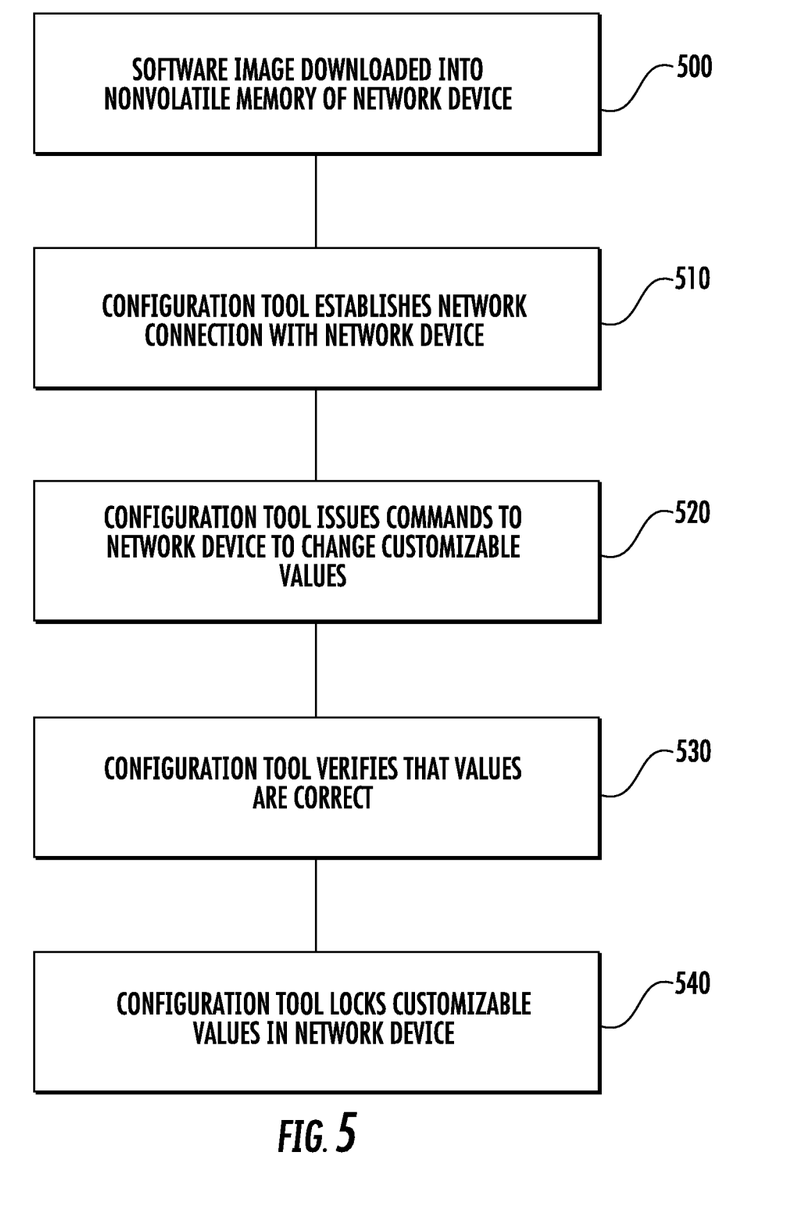
FIG. 5 shows a flowchart of the operation during the configuration process.

FIG. 5 shows a flowchart showing the configuration of the network device 100 according to one embodiment. First, as shown in Process 500, a software image is downloaded into the first portion 126 of the nonvolatile memory 125. This may be achieved in a variety of ways. First, equipment capable of downloading the software image into a plurality of network devices simultaneously may be used. This type of equipment may be traditionally used by the manufacturer. Other methods of downloading the software image to the memory 125 are also known and within the scope of the disclosure. It should be noted that a default set of values for the customizable parameters may also be downloaded into the second portion 127 of the nonvolatile memory 125 at this time.

After the software image has been loaded, the network device 100 is ready to be customized. First, as shown in Process 510, the configuration tool establishes a network connection with the network device 100. As described above, this may be a wireless connection, using the same network protocol that the network device typically uses. In this embodiment, the network connection may be made via the first network interface 130 of the network device 100. In other embodiments, this may be a different network protocol. In these embodiments, the network connection may be made via the second network interface 160 of the network device 100. As described above, this may be a wireless connection, such as BLUETOOTH® and WIFI, or a wired connection, such as USB. It is important to note that the network device 100 may be fully assembled at this time. In fact, the network device 100 may be fully functional and ready for operation at this time.

This software image may be a reference design. However, unlike other reference designs, this reference design is designed to maximize flexibility by incorporating the use of customizable parameters. In other words, rather than creating a reference design that outputs a predetermined amount of power to the light, such as 10 Watts, the reference design determines the power level based on the value stored in a particular address in the second portion 127 of the nonvolatile memory 125. Any parameter which may vary depending on customer or application may be treated as a customizable parameter.

Once the network connection has been established, the configuration tool 10 may issue commands to the network device 100 to change specific values in the second portion 127 of the nonvolatile memory 125, as shown in Process 520. In certain embodiments, there may be multiple vendor unique commands that are created to enable this functionality. First, there may be a load command, which instructs the network device to load a new value into a certain address in the second portion 127. The new value and the address may be included as part of the command. There may be a bulk load command, which instructs the network device 100 to load the entirety of the second portion 127 with a new set of values. In this embodiment, only the new values are included in the command, as there is no need to provide addresses. There may be a read command, where the network device is instructed to return the value stored at a particular address. The address may be included as part of the command. There may be a bulk read command, which instructs the network device to return all of the values stored in the second portion 127. Of course, not all of these commands are necessary. However, a mechanism by which a new value can be stored in a particular address is needed.

Additionally, the vendor unique commands may also include a lock command, which instructs the network device 100 to ignore any further attempts to modify values in the second portion 127. Finally, there may also be an unlock command, which again allows the second portion 127 to be loaded with new values. The unlock command may include a global or device-specific password, which when transmitted to the network device 100, allows the values in the second portion 127 to be accessed.

Of course, if vendor unique commands are used, the software image that is downloaded in Process 500 must be able to interpret and execute these commands as well. In other words, the configuration tool 10 and the network device 100 both implement the same set of vendor unique commands in order to perform this sequence.

The values that are to be loaded into the second portion 127 can be obtained by the configuration tool 10 in a number of ways. First, the display element 50 may be a touchscreen, which allows the user to manually enter the values for each customizable parameter. In another embodiment, there may be a specialized software application designed for the customer. This software application may include within it the specific values for each customizable parameter. As described above, this software application may be made available on a remote server or a digital distribution platform.

After the values have been loaded into the second portion 127, the configuration tool 10 may optionally read back all of these values to verify that they are correct, as shown in Process 530. If any values are incorrect, the sequence may repeat all or part of Process 520. Once the values are verified, the configuration tool 10 may optionally lock the network device 100 so that the customizable parameters cannot be changed again, as shown in Process 540.

The sequence shown in Processes 510-540 may be completed by the manufacturer, on behalf of the customer. For example, if a customer is buying a large number of network devices from the manufacturer, the manufacturer may execute this sequence so that the components that are shipped to the customer are ready to be deployed in the customer's application. However, other options are also possible. For example, this sequence may be performed by the customer after receipt of the components from the manufacturer. The customer may determine the appropriate values of the customizable parameters and download these values into the network devices. The simplicity of this approach readily allows customization, even by customers that lack the technical expertise to recompile and reinstall the software image.

This system has the benefit of allowing the manufacturer to create a single reference design, which can be readily customized by the customers. This allows enhancements and improvements to be made to the reference design by the manufacturer without the need to create multiple custom versions for its customers. Furthermore, it allows the customers to easily migrate to newer reference designs, since the customizable parameters can easily be incorporated in the reference design.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of creating a customized software image within a network device, the network device configured to operate as part of a network using a first network protocol, the method comprising:
    loading a software image into a first portion of a nonvolatile memory in the network device, wherein the software image utilizes customizable parameters stored in a second portion of the nonvolatile memory;
    establishing a network connection between the network device and a configuration tool, using a second network protocol, different from the first network protocol, after the software image has been loaded;
    downloading new values for the customizable parameters from the configuration tool to the network device; and
    storing the new values in the second portion of the nonvolatile memory in the network device,
    wherein the configuration tool issues an unlock sequence to the network device to allow access to the customizable parameters stored in the second portion of the nonvolatile memory.

2. The method of claim 1, further comprising:
    downloading a software application to the configuration tool, the software application enabling the configuration tool to download the new values to the network device.

3. The method of claim 2, wherein the software application further includes the new values to be downloaded to the network device.

4. The method of claim 2, wherein the software application allows a user to enter the new values to be downloaded to the network device.

5. The method of claim 2, wherein the software image comprises a reference design.

6. The method of claim 1, wherein the configuration tool comprises a tablet computer or a mobile telephone and the second network protocol comprises WIFI, USB or BLUETOOTH®.

7. The method of claim 1, wherein the first network protocol comprises an IEEE802.15.4-based network protocol.

8. The method of claim 7, wherein the second network protocol comprises USB or BLUETOOTH®.

9. The method of claim 1, wherein the configuration tool uses vendor unique commands to download the new values to the network device.

10. The method of claim 1, wherein the network device comprises multiple software images, the method further comprising: executing a first software image during a configuration mode and executing a second software image during normal operation.

11. The method of claim 1, wherein the customizable parameters comprise a model number or a manufacturer's name.

12. A system for creating a customized software image in a network device, comprising:
    a network device, comprising:
        a first network interface configured to operate on a network using a first network protocol;
        a second network interface;
        a processing unit; and
        a memory device, wherein the memory includes a first nonvolatile portion containing a previously installed software image and a second nonvolatile portion containing customizable parameters utilized by the software image; and
    a configuration tool, comprising:
        a network interface;
        a processing unit; and
        a memory device, comprising instructions, which when executed by the processing unit, allow the configuration tool to:
        establish a network connection between the second network interface of the network device and the network interface of the configuration tool, using a second network protocol, wherein the first network protocol is different than the second network protocol; and
        download new values for the customizable parameters from the configuration tool to the network device via the network interface,
        wherein the network device stores the new values in the second nonvolatile portion, and
        wherein the configuration tool issues an unlock sequence to the network device to allow access to the customizable parameters stored in the second nonvolatile portion.

13. The system of claim 12, wherein the first network interface utilizes an IEEE802.15.4-based network protocol and the second network protocol comprises WIFI, BLUETOOTH® or USB.

14. The system of claim 12, wherein the configuration tool and the network device use vendor unique commands to download the new values to the network device.

15. The system of claim 12, wherein the network device comprises multiple software images, and a first software image is used during a configuration mode and a second software image is used during normal operation.

16. The system of claim 12, wherein the customizable parameters comprise a model number or a manufacturer's name.

17. The system of claim 12, wherein the previously installed software image comprises a reference design.

\* \* \* \* \*